Jan. 7, 1969  T. WARD  3,420,614
BURNERS FOR FURNACES

Filed Dec. 22, 1966  Sheet 1 of 5

INVENTOR
TREVOR WARD
BY Hane and Nydick
ATTORNEY

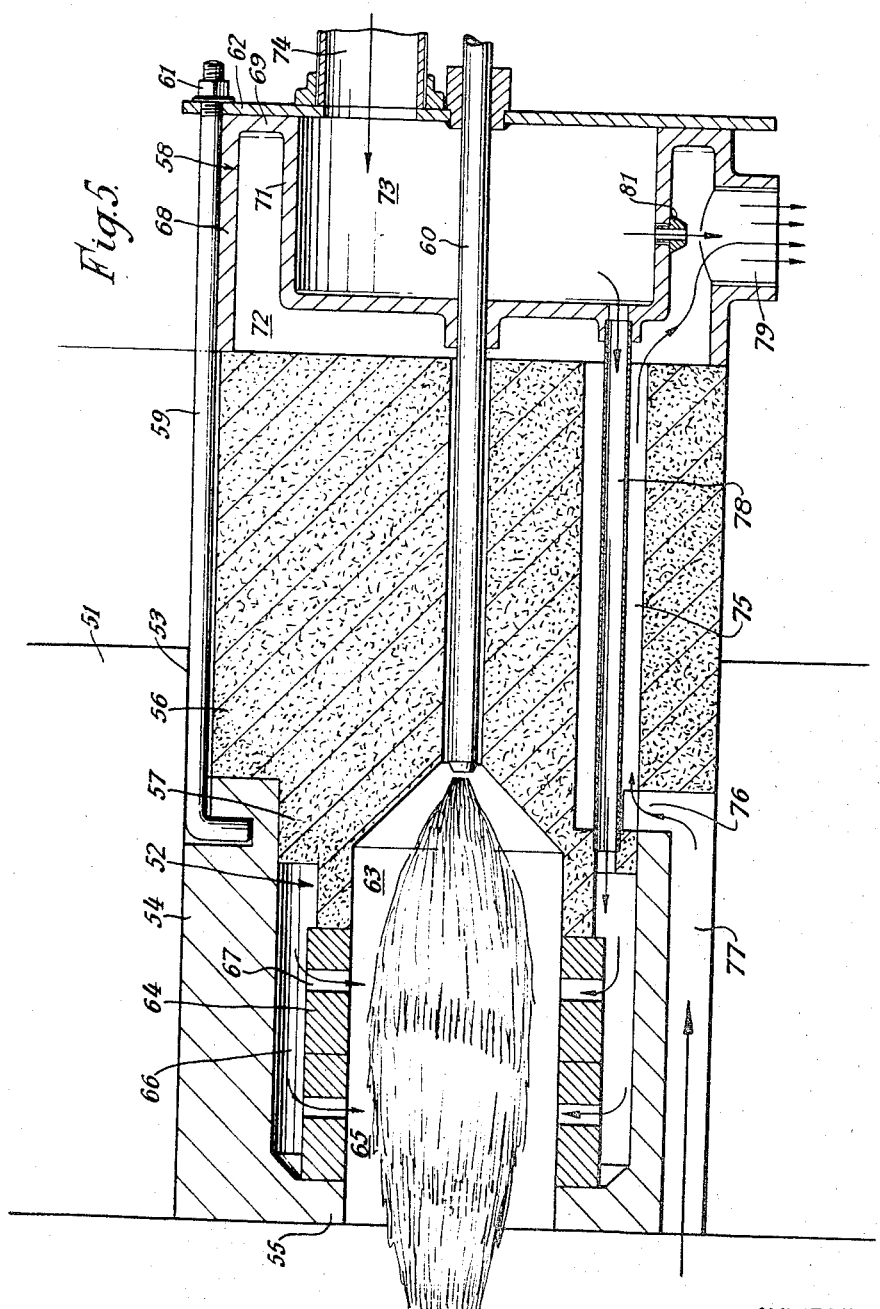

United States Patent Office 3,420,614
Patented Jan. 7, 1969

3,420,614
BURNERS FOR FURNACES
Trevor Ward, London, England, assignor to Hotwork Limited, London, England
Filed Dec. 22, 1966, Ser. No. 603,879
U.S. Cl. 431—215
Int. Cl. F23d 11/44
4 Claims

ABSTRACT OF THE DISCLOSURE

The combustion air supplied to a furnace burner is heated before reaching the combustion zone by passing it through passages in a heat exchanger surrounding a fuel gas supply conduit, gases from the furnace being passed through other passages in the heat exchanger to provide the heat.

---

This invention relates to burners for furnaces, the burner being of the kind having a combustion zone defined by a nozzle adapted to be inserted in an opening in a furnace wall and having fuel gas and air for combustion supplied separately to said combustion zone through concentric orifices, at least one of said orifices being partially obstructed by a flange or like radially extending member to create turbulence in the flow of the gas and/or the combustion air and produce random mixing thereof as described, for example, in our British patent specification No. 1,000,231.

It is the object of the present invention to provide means for preheating the combustion air supplied to the burner, so as to provide a higher efficiency than is normally obtained.

According to the invention, in a burner for furnaces having a combustion zone defined by a nozzle adapted to be inserted in an opening in a furnace wall and having fuel gas and air for combustion supplied separately to said combustion zone, the fuel gas is supplied to the burner through a conduit coaxial with the nozzle, and the combustion air is supplied through one series of passages in an annular heat exchanger also surrounding the fuel gas supply conduit, the said heat exchanger having another series of passages through which furnaces gases from the furnaces are passed in heat-exchanging relation to the combustion air.

Preferably, the furnace gases are drawn through the heat exchanger by ejector means.

The heat exchanger may comprise a plurality of tubes defining concentric annular passages surrounding the fuel gas supply conduit, a pair of annular headers between which the said tubes extend, radial webs in the headers defining segmental chambers in the said headers, and arcuate ribs extending between said radial webs, the arcuate ribs in each segmental chamber being offset radially with respect to the arcuate ribs in adjacent segmental chambers and the ribs in each segmental chamber being arranged to close alternate ones of the annular passages defined by the tubes, so that one set of alternate annular passages are connected to one set of alternate segmental chambers in both headers and another set of alternate annular passages are correspondingly connected to another set of alternate segmental chambers in both headers.

Alternatively, the heat exchanger may comprise a block of refractory material formed with longitudinal bores through which extend tubes of smaller external diameter than the bores, the tubes constituting the said one series of passages and the annular spaces in the bores around the tubes constituting the said other series of passages.

Some embodiments of the invention will now be described, by way of example, with reference to the accompanying drawings, in which:

FIGURE 5 is a longitudinal section through another form of burner according to the invention.

Figure 1:
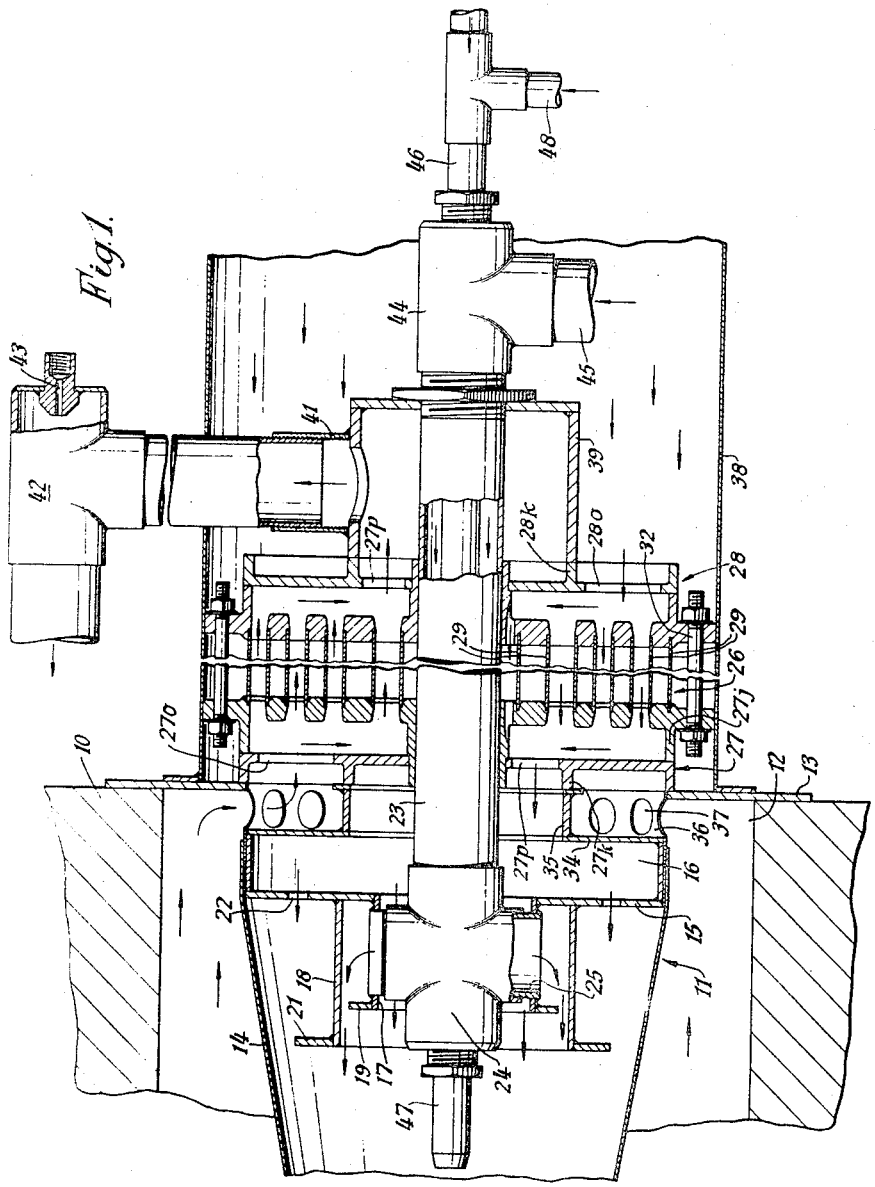
FIGURE 1 is a longitudinal section, with some parts shown in elevation, through one form of burner according to the invention.

Referring to FIGURE 1 of the drawings, part of a wall of a furnace is shown at 10 and a burner, generally indicated by the reference numeral 11, is mounted in an opening 12 in the said wall, the burner being supported by a metal plate 13 abutting against the external surface of the furnace wall. The burner comprises a nozzle 14 of frusto-conical shape, open at its smaller end which projects towards the interior of the furnace, and a disc 15 defining the front wall of an air supply chamber 16 forms a partition between the larger rear end of the nozzle and said chamber. Two concentric tubes 17 and 18 extend forwardly into the nozzle 14 from the disc 15, the part of the said disc within the inner tube 17 being cut away to form an opening. The outer tube 18 is longer than the inner tube, and the tubes are provided at their forward ends respectively with radially outwardly extending flanges 19 and 21. Apertures 22 in the disc 15 provide communication between the air supply chamber 16 and the annular space between the outer tube 18 and the nozzle 14.

A fuel gas supply conduit 23, smaller in diameter than the inner tube 17, and concentric therewith, extends through the central opening in the disc 15 into the inner tube 17 and is connected therein to a hollow fitting 24, closed at its forward end and having lateral branches 25 leading to two radial openings in the tube 17 so that gas flowing in the gas supply conduit is fed to the annular space between the tubes 17 and 18.

Air from the air supply chamber 16 can flow through the inner tube 17 around the fitting 24 and between the branches 25 thereof, so that the gas enters the combustion chamber between an inner stream of air from the tube 17 and an outer stream of air from the annular space between the outer tube 18 and the nozzle 14, both streams of air coming from the air supply chamber 16.

Figure 2:
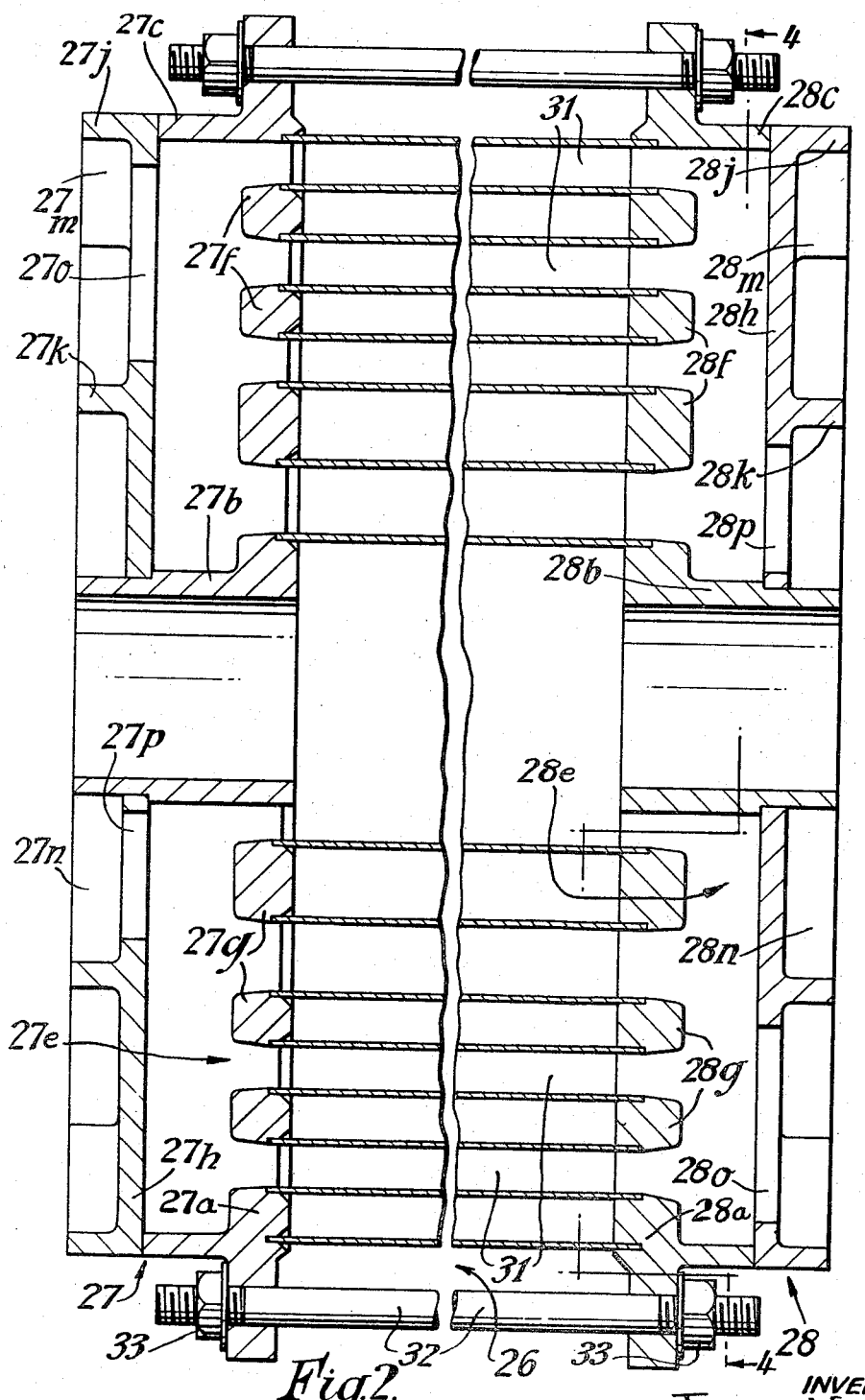
FIGURE 2 is a similar longitudinal section, on a larger scale, through the heat exchanger.
Figure 3:
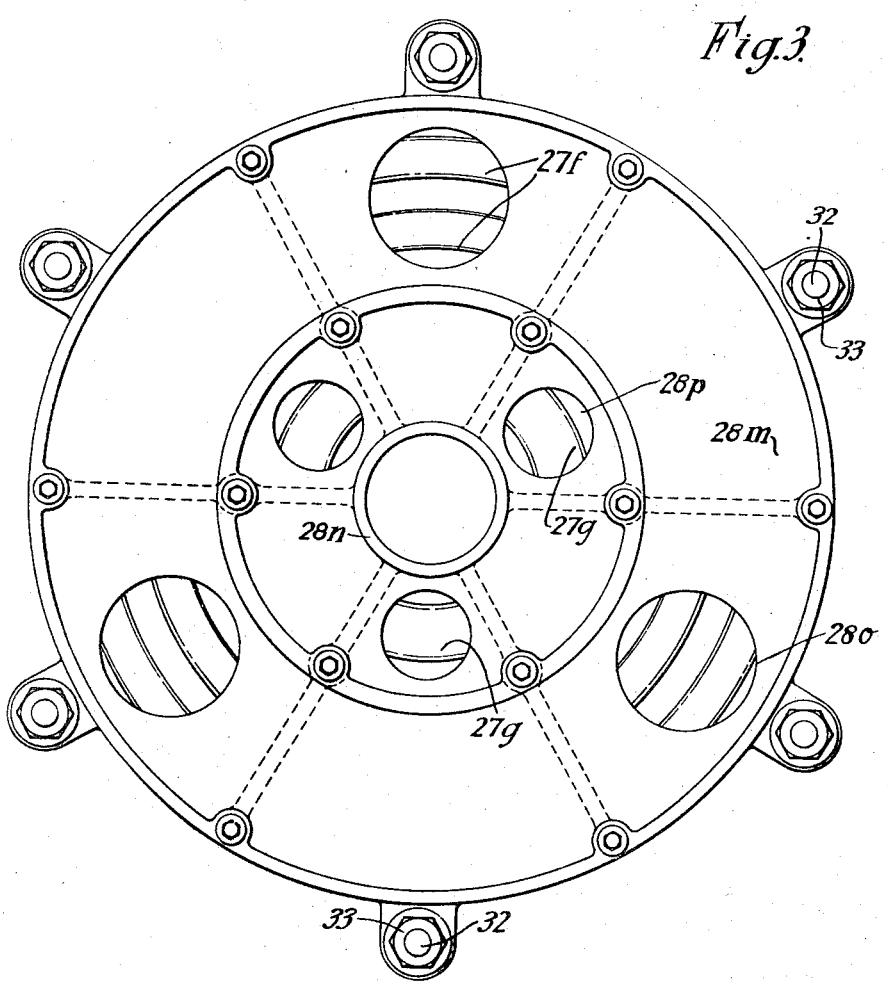
FIGURE 3 is an end elevation of the heat exchanger shown in FIGURE 1, on the same scale as FIGURE 2.
Figure 4:
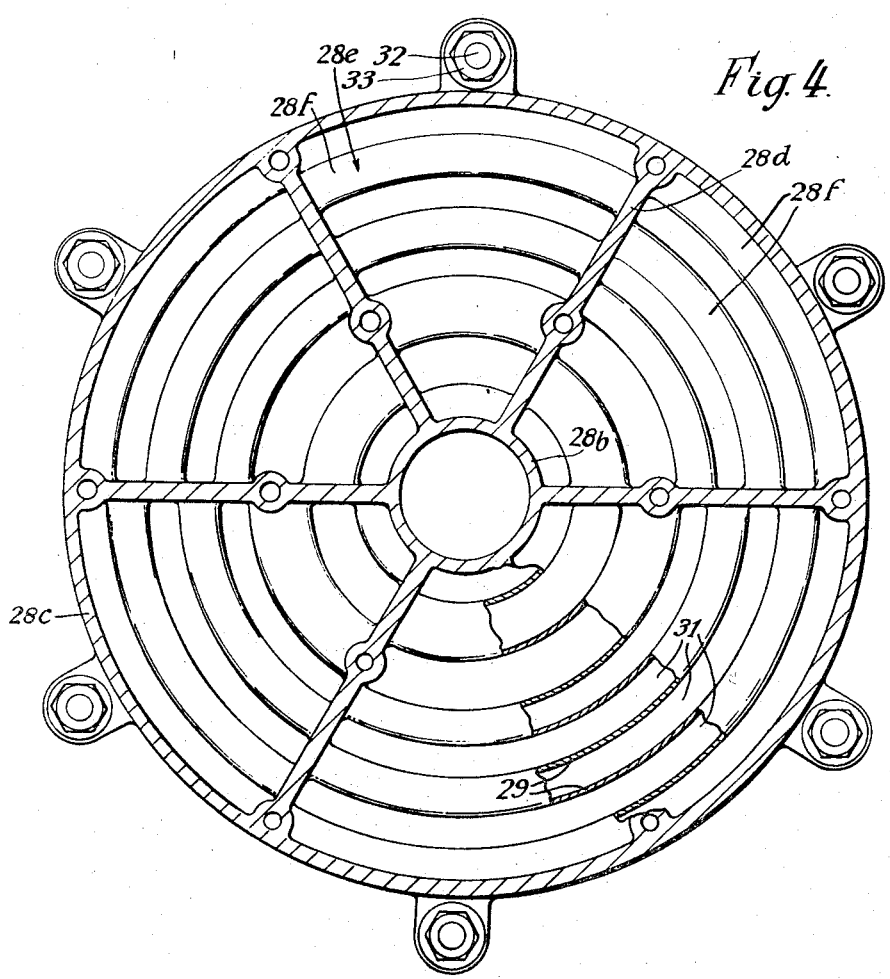
FIGURE 4 is a sectional elevation mainly on the line 4—4 of FIGURE 2.

An annular heat exchanger generally indicated by the reference 26, is mounted around the fuel gas supply conduit 23 behind the air chamber 16, the said heat exchanger comprising front and rear annular headers 27 and 28, axially spaced apart, and a series of tubes 29, concentric with one another and with the gas supply conduit 23, which tubes define annular passages 31 connecting the said headers. Referring to FIGURE 2, each header comprises two annular parts secured together, one such part of the header 27 being indicated by the reference 27a, and comprising inner and outer rings 27b and 27c connected by radial webs of the same axial length as the outer ring 27c. The radial webs are, for example, six in number, and divide the space within the header into segmental chambers 27e. Between the radial webs extend arcuate ribs, the ribs 27f in alternate segmental chambers being offset radially with respect to the ribs 27g in the intervening segmental chambers. The ribs 27f in each of three alternate segmental chambers close off the ends of alternate passages 31 from those segmental chambers, and the ribs 27g in each of the other three segmental chambers close off the ends of the intervening passages 31 from those segmental chambers. The header 28 comprises a part 28a corresponding to the part 27a of the header 27, the rings and ribs thereof being indicated by the references 28b to 28g, the same letters being used for the same parts as in connection with the header 27. The radial webs of the header 28 are indicated at 28*d* in FIGURE 4.

The other parts of the two headers comprise plates 27*h* and 28*h* respectively which abut against the edges of the rings 27*c* and webs 27*d* and of the rings 28*c* and webs 28*d* respectively, the said plates 27*h* and 28*h* having central apertures through which the inner rings 27*b*, 28*b* project. Circumferential flanges 27*j* and 27*k* on the plate 27*h* and corresponding flanges 28*j* and 28*k* on the plate 28*h* define annular cavities 27*m* and 28*m* the sides of the said plates opposite to the header parts 27*a*, 28*a*, whilst the flanges 27*k* and 28*k*, with the projecting portions of the inner rings 27*b* and 28*b* of the parts 27*a* and 28*a* define further annular cavities 27*n* and 28*n* surrounded by the cavities 27*m* and 28*m* respectively. Openings 27*o* and 28*o* in the plates 27*h* and 28*h* respectively lead into the cavities 27*m* and 28*m*, and other openings 27*p* and 28*p* in the said plates lead into the cavities 27*n* and 28*n*, the openings 27*o* and 27*p*, and the openings 28*o* and 28*p* opening into different segmental chambers of the respective header parts 27*a*, and 28*a*.

The headers 27 and 28 are assembled with the tubes 29, which engage shoulders on the ribs 27*f*, 27*g*, 28*f*, 28*g*, in such a way that a segment of the header 27 into which an opening 28*o* leads is opposite a segmental chamber of the header 28 into which an opening 28*p* leads. The headers are secured one to the other by rods 32 screw-threaded at their ends to receive nuts 33 engaging shoulders on the said headers.

The rear wall of the air supply chamber 16 is formed by an annular plate 34 having a cylindrical wall 35 extending rearwardly from the edge of its central opening. The outer circumferential flange 27*j* of the header 27 abuts on the plate 13 around the edge of a central opening therein, and the wall 35 abuts against the inner circumferential flange 27*k* of the header 27. A cylindrical shroud 36 surrounding the gap between the plate 34 and the plate 13 is apertured at 37 to permit furnace gases from the opening 12 to flow into the heat-exchanger through the openings 27*o*.

A cylindrical casing 38 surrounding the heat exchanger 26 extends rearwardly therefrom to provide an air inlet duct for the burner, the openings 28*o* in the header 28 of the heat exchanger communicating with the said duct. A tube 39, mating at its forward end with the flange 28*k* of the header 28, and closed at its rear end, communicates, through a pipe 41 passing radially through the casing 38, with an ejector 42 including a nozzle 43 through which a jet of compressed air is directed across the end of the pipe 41 to create suction in that pipe.

The rear end of the fuel gas supply conduit 23 is connected by a T-piece 44 to a gas supply pipe 45.

In order that oil fuel may, if desired, be burnt along with the fuel gas, an oil fuel supply pipe 46 is mounted concentrically within the fuel gas supply conduit 23 and leads to a burner nozzle 47 in the combustion chamber. The oil fuel is fed to the nozzle 47 by compressed air admitted to the pipe 46 through a pipe 48.

When the burner is in operation, using fuel gas, the gas is supplied through the conduit 23, and flows through the branches 25 of the fitting 24 into the annular space between the tubes 17 and 18, from which annular space it enters the combustion chamber. Air from the casing 38 flows through the openings 28*o* in the plate 28*h* of the header 28 into alternate segments of the said header and so through alternate passages 31 into alternate segments of the header 27, from which it flows through the openings 27*p* in the plate 27*h* into the air supply chamber 16. Some of the air then passes through the tube 17 into the combustion chamber, the rest of the air passing through the openings 22 into the space between the outer tube 18 and the nozzle 14. The air and fuel gas become mixed in the combustion chamber and are burnt therein.

The ejector 42, by creating suction in the pipe 41, draws hot furnace gases through the openings 27*o* in the plate 27*h* of the header 27 into the segmental chambers 27*e* of that header between the chambers 27*e* through which the air passes, through the passages 31 communicating with those chambers into the segmental chambers of the header 28 communicating through the openings 28*p* in the plate 28*h* with the tube 39. Thus the hot furnace gases pass through the heat exchanger 26 and give up heat to the incoming air, the preheating of the said air increasing the efficiency of the burner.

Referring to FIGURE 5 of the drawings, a part of the wall of a furnace is shown at 51, and a burner, generally indicated by the reference numeral 52, is mounted in an opening 53 in the said wall. The burner comprises a nozzle 54 fitting in the opening 53, the nozzle being tubular and having an internal flange 55 at its inner end. A cylindrical block 56 of refractory material abuts against the outer end of the nozzle 54 and has a spigot portion 57 which projects into the nozzle, and a hollow cylindrical member 58 abuts against the outer end of the block 56, the parts being retained in assembled relation by rods 59, bent through 90° at their inner ends to engage in radial cavities in the nozzle 54, and screw-threaded at their outer ends to receive nuts 61 engaging a metal plate 62 closing the outer end of the hollow cylindrical member 58.

The spigot portion 57 of the block 56 is recessed as shown at 63, and a fuel gas supply pipe 60 extending co-axially through the hollow member 58 and the block 56 leads into the recess 63. A sleeve 64, clamped between the spigot portion 57 and the flange 55 of the nozzle, surrounds a combustion space 65 forming an extension of the recess 63 and separates from the said combustion space an annular cavity 66 in the nozzle, which cavity 66 communicates with the combustion space 65 through radial openings 67.

The hollow cylindrical member 58 includes an outer peripheral wall 68, an annular rear wall 69 extending radially inwardly from said peripheral wall, and a re-entrant cup-like portion 71. The space between the peripheral wall 68 and the re-entrant portion 71, together with a space between the end of the said re-entrant portion and the block 56 constitutes a chamber 72, hereinafter called the outlet chamber, and the interior of the re-entrant portion 71, which is closed by the plate 62 constitutes an air supply chamber 73 to which air under pressure is fed through a conduit 74 by a blower or compressor.

An annular series of longitudinal bores 75 are formed in the block 56, the bores extending from the outer face of the block to positions adjacent its inner end, and being connected, at their inner ends, by radial openings 76, to longitudinal grooves 77 in the outer peripheral surface of the nozzle 54, which grooves extend to the inner end of the nozzle.

Extending through each bore 75 is a tube 78, preferably of metal, the external diameter of the tubes being substantially less than the diameter of the bores. Each tube 78, at its inner end, extends into a reduced continuation of the bore 75 opening into the annular cavity 66, and at its outer end is connected to the air supply chamber 73.

A duct 79, opens radially from the outlet chamber 72, and a nozzle 81 mounted in the peripheral wall of the air supply chamber 73, is positioned co-axially with the said duct so that air flowing from the said nozzle 81 produces an injector effect tending to extract gases from the chamber 72.

When the burner is in operation, fuel gas is supplied through the pipe 58 to the recess 63 and so into the combustion space 65, air from the air supply chamber 73 passes through the tubes 78 into the annular cavity 66, from which it passes radially through the openings 67 into the combustion space 65, the air and fuel gas mixing in the combustion space and burning therein. Air also flows through the nozzle 81, and, since the air in the chamber 73 is under compression, creates an injector effect in the duct 79 which produces suction in the chamber 72. This suction draws hot furnace gases through the grooves 77 and bores 75 into the chamber 72, the said gases giving up heat to the inflowing air in the tubes 78, thus preheating the said air and so increasing the efficiency of the burner.

The burner described with reference to FIGURE 5 is particularly suitable for use when the temperature of the furnace atmosphere is very high.

I claim:
1. A burner assemblage for a furnace having a combustion zone defined by a nozzle insertable into an opening in a furnace wall and supplied separately with fuel gas and combustion air; said burner assemblage comprising in combination:
   a supply conduit for supplying fuel gas to the burner disposed coaxially with the nozzle;
   a heat exchanger for supplying combustion air to the burner, said heat exchanger including a plurality of concentric annular passages surrounding the fuel gas supply conduit and forming two series of passages, and conduits for feeding outside air and conduits for feeding hot furnace gases connected to alternate ones of said passages thereby effecting a heat-exchange between said passages;
   said heat exchanger including a plurality of tubes defining said concentric annular passages, a pair of annular headers between which said tubes extend, radial webs in the headers defining segmental chambers in said headers, and arcuate ribs extending between said radial webs, the arcuate ribs in each segmental chamber being offset radially with respect to the arcuate ribs in adjacent segmental chambers and the ribs in each segmental chamber being arranged to close alternate ones of the annular passages defined by the tubes, so that one set of alternate annular passages are connected to one set of alternate segmental chambers in both headers and another set of alternate annular passages are correspondingly connected to another set of alternate segmental chambers in both headers.

2. A burner according to claim 1, wherein the furnace gases are drawn through the heat exchanger by ejector means.

3. A burner according to claim 1, wherein each header comprises an open-ended ring carrying the radial webs and arcuate ribs and an end plate engaging the outer end of said ring and the outer ends of the radial webs, the said end plate being formed with two concentric series of apertures and the apertures of one said series opening into one set of alternate segmental chambers while the apertures of the other said series open into the other set of alternate segmental chambers.

4. A burner assemblage for a furnace having a combustion zone defined by a nozzle insertable into an opening in a furnace wall and supplied separately with fuel gas and combustion air, said burner assemblage comprising in combination:
   a supply conduit for supplying fuel gas to the burner disposed coaxially with the nozzle;
   a combustion air supply duct surrounding said gas supply conduit;
   a heat exchanger for heating combustion air supplied through said supply duct before said combustion air is supplied to the burner,
   said heat exchanger including a plurality of concentric annular passages surrounding the fuel gas supply conduit and forming two series of passages, two annular headers between which said tubes extend, radial partition means dividing each of said headers into a plurality of chambers, end closure members closing off one series of alternate passages from at least one chamber in each header, end closure members closing off the remaining passages from at least one other chamber in each header, means defining an annular chamber surrounding said fuel gas supply conduit within said combustion air supply duct, said headers having first apertures connecting said one chamber in one header to the combustion air supply duct and said one chamber in the other header to the combustion zone, and second apertures connecting said other chamber in said other header to the exterior of the nozzle and said other chamber in said one header to said annular chamber; and
   suction operated means to draw furnace gases from around the nozzle through said heat exchanger into said annular chamber.

References Cited

UNITED STATES PATENTS

| 2,081,678 | 5/1937 | Rosenblad | 165—165 |
| 3,163,202 | 12/1964 | Schmidt et al. | 158—7.5 |

FOREIGN PATENTS 408,979 9/1966 Switzerland.

FREDERICK L. MATTESON, JR., *Primary Examiner.*

EDWARD G. FAVORS, *Assistant Examiner.*